Aug. 23, 1960

H. E. SINGLETON ET AL 2,949,785

LOW DRIFT GYRO-STABILIZED PLATFORM

Filed Feb. 29, 1956

INVENTORS
HENRY E. SINGLETON
HAROLD F. ERDLEY
BY
Seymour M. Rosenberg
ATTORNEY 2,949,785

LOW DRIFT GYRO-STABILIZED PLATFORM

Henry E. Singleton, Downey, and Harold F. Erdley, Los Angeles, Calif., assignors, by mesne assignments, to Litton Industries, Inc., Beverly Hills, Calif., a corporation of Delaware Filed Feb. 29, 1956, Ser. No. 568,949

14 Claims. (Cl. 74—5.34)

The present invention relates to a gyro-stabilized platform and more particularly to an extremely low drift rate platform employing two 2-degree-of-freedom gyroscopes for the stabilization thereof.

A gyro stabilized platform is a navigational unit, often carried by a moving vehicle such as an aircraft or a ship, wherein an element (the stabilizable element) is power driven relative to the vehicle frame (the reference frame) to maintain an attitude defined by gyroscopes mounted on the element. In one mode of operation of a gyro-stabilized platform the attitude which is defined by the gyroscopes and which is maintained by the element remains unvarying and fixed in inertial space throughout the vehicle's journey. In another mode of operation of a gyro-stabilized platform (the so-called local vertical mode of operation) very small precessional torques are fed into the gyros to continuously erect the gyros to the sensed or calculated earth vertical at the point of vehicle location. The principal functions of the gyro-stabilized platform are to isolate the gyroscopes from vehicle motion to thereby decrease the drift rate of the gyroscopes, to furnish an attitude reference to a pilot or autopilot which is controlling the vehicle, and in many instances to provide a rotationally stabilized body (the stabilizable element) on which accelerometers can be mounted so as to sense vehicle acceleration along known coordinate axes. By continuously integrating the vehicle accelerations, as detected by the accelerometers, the vehicle velocity and position relative to its starting point can be continuously determined.

In recent years, an increasingly large amount of research effort has been devoted to the design and development of gyro-stabilized platforms. Almost all of the recently developed stabilized platforms which have arisen from this intensive research effort have utilized single-degree-of-freedom gyros. A typical one of such prior art gyro-stabilized platforms has three single-degree-of-freedom gyros mounted on the platform, each gyro defining one "sensitive" axis of rotation of the platform, and the three gyros together defining three mutually perpendicular sensitive axes of rotation of the element.

Each gyro is ordinarily rigidly coupled to the platform for rotation about its sensitive axis, and therefore in response to rotation of the platform in any direction, each gyro is directly torqued by the component of platform rotation along its sensitive axis and is thereby constrained to precess at right angles to its sensitive axis. Such precessions of the gyros relative to the platform are detected by pick-off devices mounted on the platform and are converted to error signals which are in turn fed into servo actuators to accomplish the counter rotation of the platform. Such counter rotation has the dual effect of returning the platform to its initial position and of counter-torquing the gyros to thereby counter-precess the gyros so as to return the gyros to their initial positions.

The present inventors have recognized that a number of serious disadvantages are found in prior art stabilized platforms of the described type. Probably the most serious disadvantage is that detection of rotation is dependent upon precession of the gyros and therefore dependent upon actual torquing of the gyros in response to platform rotation. Since such torques are transmitted to the gyros through their gimbal bearings, these bearings must necessarily be large enough and heavy enough to support these torques without injury. However since such large and heavy bearings have high friction characteristics they also transmit undesired torques about the supposedly free gimbal axis of the gyro and thereby greatly increase the random drift rate of the gyro.

Another disadvantage of the prior art gyro-stabilized platforms arises from what has been termed "cross coupling" between the sensitive axes. This is a source of error, not always recognized by those skilled in the art, which is peculiar to platforms utilizing gyro precession for the detection and measurement of platform rotation. Cross coupling error causes relatively large undesired platform drifts and arises from the fact that when a gyro has been precessed away from its initial position in response to rotation about its sensitive axis, the gyro then becomes sensitive to subsequent rotation about axes other than its correct sensitive axis. In this manner, because of precession of the gyros, rotations about the sensitive axis of any of the three single-degree-of-freedom gyros can be improperly cross coupled into the other two gyros. The net effect of such cross coupling in most stabilized platform systems is that unidirectional drift rates are impressed upon the stable platform, the magnitude of these drift rates being approximately proportional to the square of the amplitude of gyro precession.

In order to decrease the above-described cross-coupling error, it has been necessary to maintain total gyro precession at very low amplitudes, this being accomplished by utilizing very "tight" servos which respond to infinitesimal precessions and act very quickly to counter-rotate the platform and thereby counter-precess the gyros back to their undisplaced position before the precessions can attain significant amplitude. To obtain such "tight" high performance servos is a difficult electronic problem imposing very stringent high gain and high stability requirements on overall servo operation and occasioning greatly increased complexity of the amplifiers and actuators utilized in the servos. Even when servos having the highest practically feasible performance characteristics are constructed and utilized, the magnitude of platform drift caused by cross coupling error still is great enough to be a very substantial component of total platform drift.

Still another disadvantage of prior art platforms has been their relatively high weight. Since stabilized platforms are often utilized as components of airborne navigation systems, minimal weight is a very desirable attribute of a stabilized platform. In many of the prior art platforms total weight is greatly increased by the necessity for at least three separate gyros. Moreover, overall weight is further increased by the necessarily heavy and strong gimbal bearing assemblies which must be utilized in these gyros to transmit torque to the gyro. In addition the relatively complex high performance servos required in prior art platforms tend to utilize large numbers of components and thus further increase overall platform weight.

Recognizing these various disadvantages of the recently developed stabilized platforms employing three single-degree-of-freedom gyros, the present inventors have turned to a type of platform which is stabilized by means of two 2-degree-of-freedom gyroscopes. In the recent history of the art, development of platforms employing 2-degree-of-freedom gyroscopes has been virtually discontinued partly because of supposed difficulties presented by the construction of 2-degree-of-freedom gyroscopes and partly because of failure to recognize the profound advantages that can accrue through correct use of two 2-degree-of-freedom gyros in cooperation with other elements of a stabilized platform.

According to one feature of the gyro-stabilized platform of the present invention, rotation of the platform is detected by reason of its displacement relative to two 2-degree-of-freedom gyros mounted thereon, the gyros being maintained in an ideally free condition relative to the platform so that no precession of the gyros occurs in response to platform rotation. Since torques are not to be transmitted to the gyros by platform rotations, the gimbal bearings (through which such torques are ordinarily transmitted in prior art single-degree-of-freedom units) of the gyroscopes can safely be made very small and light, thereby greatly reducing bearing friction which would otherwise cause platform drift and reducing overall weight of the gyro assembly. Moreover since the gyros are not constrained to precess in response to platform rotation, the gyros always maintain their positions relative to one another independent of platform rotations and therefore cross coupling error (which arises from such relative gyro precession) is entirely eliminated, thereby removing an important source of platform drift.

It can be said that, in a platform of the described type, because of the isolation and freedom of the gyros from platform disturbances the overall drift of the gyros can be made relatively independent of the platform dynamics. This allows great reduction in the complexity of the platform servos. For example, in prior art gyro-stabilized platforms the fact that platform rotation is detected by monitoring gyro precession results in a necessity for complicated lead networks in the platform servos to compensate for the inherent time lags created by the relatively slow operation of gyro precession. Because of this requirement for the inclusion of complex lead (anticipation) networks, prior art servos have been electrically complex and relatively heavy. On the other hand in the gyro-stabilized platform of the present invention, since platform rotation relative to gyros is directly detected without any time delay, very much less complex servos may be utilized which include only minimal lead networks, thereby greatly reducing the electronic complexity and weight of the platform servos.

Another advantageous feature of the stabilized platform of the present invention is that platform drift about one axis of rotation is greatly reduced through sharing or averaging of information obtained from both gyros. It will be recognized that each 2-degree-of-freedom gyro can define two sensitive axes of rotation, and that the two gyros together can define four sensitive axes of rotation. Since only three sensitive axes are required to measure all possible rotations of the platform, the fourth sensitive axis is redundant. However, according to the inventive concept of the present invention, a sensitive axis of one gyro is paired with a sensitive axis of the other gyro, the two sensitive axes being aligned with one another to define a common axis of rotation. Information is obtained from both of the paired axes as to the rotation of the platform thereabout, the angle pick-off signals from the two axes being effectively averaged to represent the mean rotation of the platform about the commonly defined axis. In this manner the errors produced by any random gyro drifts about this axis are considerably reduced, since by averaging the two essentially independent measures of rotation about this axis, the probable error due to random gyro drift is reduced by the factor $$\frac{1}{\sqrt{2}}$$

Preferably, as will be described hereinbelow the paired sensitive axes will be utilized so as to define the vertical or azimuth axis. A very ingenious arrangement is used in the platform of the present invention for averaging signals from the two paired axes, which greatly simplifies the operation of the auxiliary servos. The platform is directly slaved in the common axis to only one of the gyros and is indirectly slaved to the other gyro in the following manner. Any incremental rotational displacement between the gyros about the common axis is converted to an error signal which is utilized to precess the two gyros towards each other. In operation, in response to such incremental displacement both gyros are simultaneously precessed towards each other at substantially the same rates, the final position which the two gyros attain being intermediate between their initial positions. In this manner the two gyros are slaved to one another so that they tend in operation to continuously define a common rotational position, about the shared axis, this common rotational position being determined by the average of the independent drift rates of the two gyros about the shared axis.

Still another important feature of the gyro-stabilized platform of the present invention is that through proper orientation of the gimbals of the gyros, the combination of gravitational force and sideplay and endplay in the gimbal bearings is unable to cause drift about the azimuth axis. In prior art gyros, sideplay and endplay in these bearings in combination with gyro flotation errors produces a torque which acts to precess the gyro about the azimuth axis. However as described hereinbelow, by orienting the gyros on the platform so that the outer gimbal bearings define the vertical or azimuth axis, even though such gyro flotation errors and bearing play exist no precessional drift about the azimuth axis occurs. This is an improvement of considerable importance since almost invariably in the use of a stabilized platform, an accurate directional reference is required.

It is therefore an object of the present invention to provide a gyro-stabilized platform which has substantially lower drift rates and is also far lighter than prior art gyro-stabilized platforms.

It is another object of the present invention to provide a gyro-stabilized platform employing two 2-degree-of-freedom gyros, the gyros being positioned and mounted on the platform so as to be unconstrained and free from precessional torques in response to platform rotation.

It is still another object of the present invention to provide a gyro-stabilized platform which is free from error drift rates caused by cross coupling of sensitive axes of its gyros.

It is yet another object of the present invention to provide a gyro-stabilized platform employing two 2-degree-of-freedom gyros wherein a sensitive axis of one gyro is aligned with a sensitive axis of the other gyro to define a single axis of rotation, random drifts of the two gyros about this single axis being averaged by positioning the platform in response to rotational signals from both gyros.

It is still another object of the present invention to provide a gyro-stabilized platform employing two 2-degree-of-freedom gyros positioned to have one pair of substantially coparallel sensitive axes for the measurement of platform rotation, the gyros being slaved to one another so as to be precessed towards each other about said coparallel axes whenever there is incremental rotational displacement between the gyros about said axes, the gyros thereby being returned to a position intermediate their displaced positions.

It is a further object of the invention to provide a gyro-stabilized platform employing two 2-degree-of-freedom gyros, at least one of said gyros being positioned so as to have its outer gimbal axis substantially parallel to the direction of gravitational attraction.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

Figure 1:
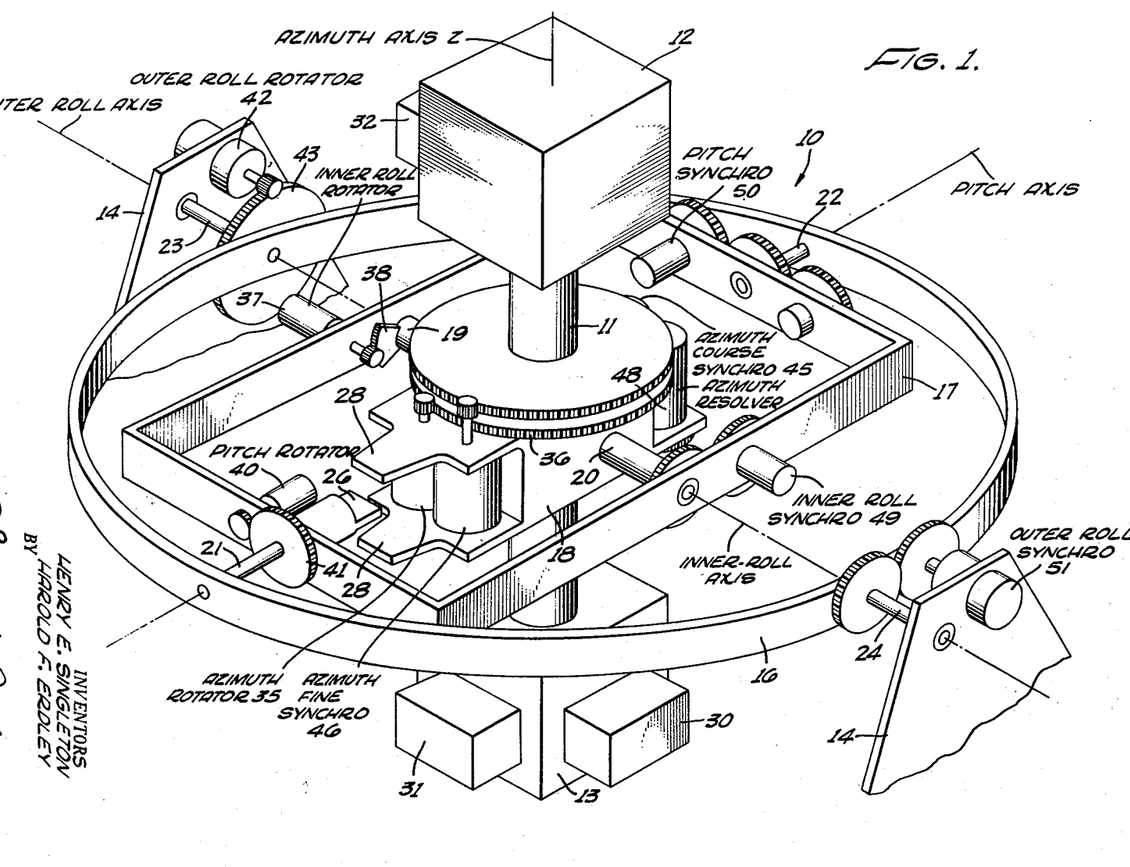
Fig. 1 is an isometric view illustrating a preferred embodiment of a gyro stabilized platform constructed in accordance with the present invention.

With reference now to the drawings wherein like or corresponding parts are similarly designated throughout the several views, there is shown in Fig. 1 a gyro-stabilized platform generally designated 10 constructed according to the present invention which is seen to include a stabilizable element 11 on which are mounted two 2-degree-of-freedom gyroscopes designated gyro A and gyro B respectively, it being understood that gyros A and B are contained within enclosing boxes 12 and 13 respectively which are affixed to stabilizable element 11. The A and B gyros together as will be described hereinbelow, define a set of coordinate axes which maintain a fixed attitude or orientation in inertial space and thereby supply an inertial reference to which stabilizable element 11 is slaved. By means of pick-offs intercoupling the gyros and element 11 any rotational displacements of stabilizable element 11 about these coordinate axes with respect to the gyros are immediately detected and in response to such rotational displacements element 11 is immediately rotated with respect to a reference frame 14 in such manner as to eliminate the displacements of element 11 with respect to the A and B gyros, element 11 thereby being continuously stabilized in inertial space so that it maintains the fixed attitude defined by the A and B gyros.

It will be understood that in operation reference frame 14 will ordinarily be fixedly mounted in a vehicle such as an aircraft or ship, element 11 then being utilized as an attitude reference from the instantaneous attitude of the vehicle can be determined and conveyed to a pilot or to automatic control devices. Moreover if the accelerations of the vehicle are to be continuously integrated to determine the velocity and/or position of the vehicle, the necessary acceleration detecting instruments (accelerometers) will be mounted on stable element 11, so that they will detect acceleration along known coordinate axes defined by the gyros and maintained by element 11. For purposes of illustration three accelerometers 30, 31 and 32 for detecting accelerations along known coordinate axes (to be later designated as the $x$, $y$, and $z$ coordinate axes) are shown in Fig. 1 mounted on element 11. Although it will be understood that many different types of prior art accelerometers might be utilized in connection with the gyro-stabilized platform of the present invention, it is believed that a torque balance type of accelerometer is especially suitable because of its features of large dynamic range simplicity, low weight and volume and high sensitivity throughout its range. A preferred design for such a torque balance accelerometer is described in copending U.S. patent application Serial No. 568,950, filed February 29, 1956 for "Precision Torque Balance Accelerometer" by the present inventors.

In order to allow the stabilizable element 11 to be freely rotated in the required manner with respect to reference frame 14, element 11 is mounted with respect to reference frame 14 in a four axis gimbal suspension system which comprises an outer gimbal 16, an intermediate gimbal 17 and an inner gimbal 18. As illustrated in Fig. 1, element 11 is journaled in gimbal 18 so that it is free to rotate about its own axis (designated in Fig. 1 as the azimuth axis $z$). Inner gimbal 18 includes stub shafts 19 and 20 which are journaled in bearings in intermediate gimbal 17, whereby gimbal 18 is pivoted in gimbal 17 for rotation about an axis designated as the inner roll axis which is perpendicular to the aforementioned azimuth axis. In turn, intermediate gimbal 17 is suspended from outer gimbal 16 by two stub shafts 21 and 22 which are extensions of outer gimbal 16 and are journalled bearings in intermediate gimbal 17, intermediate gimbal 17 thereby pivoted with respect to outer gimbal 16 for rotation about an axis designated in Fig. 1 as the pitch axis, which as shown in Fig. 1 is perpendicular to the inner roll axis. Finally referring to outer gimbal 16, it is seen to include stub shafts 23 and 24 which are journalled in bearings in reference frame 14, whereby outer gimbal 16 is pivoted for rotation about an axis designated in Fig. 1 as the outer roll axis. As illustrated in Fig. 1, the outer roll axis is perpendicular to the pitch axis and in the absence of pitch rotation is co-parallel with the inner roll axis.

The use of a four axis platform gimbal suspension of the described type (rather than the use of the conventional three axis platform suspension) is preferred because the use of four axis suspension eliminates for the most part the danger of gimbal lock which might otherwise occur for certain positions of reference frame 14. As will be described hereinbelow, in the expected modes of operation of platform 10 rotation of element 11 about the inner roll axis will be kept at very small amplitudes. As soon as inner roll rotation is detected, corrective rotation of outer gimbal 16 about the outer roll axis is initiated, the final result of this operation being that rotation about the inner roll axis is entirely eliminated. As shown in Fig. 1 mechanical stops 26 and 28 are provided, affixed respectively to gimbals 17 and 18, to limit inner roll rotation during those times when the inner roll to outer roll correction circuit is not operating, as when electrical power is not being supplied to the stabilized platform.

Rotation of element 11 in such a manner as to continuously maintain the fixed attitude defined by gyros A and B is accomplished by means of coordinated rotations of gimbals 16, 17 and 18 about the outer roll, pitch, and inner roll axes respectively and by the rotation of element 11 about the azimuth axis. As indicated in Fig. 1, to rotate element 11 about the azimuth axis, an azimuth rotator 35 (which may be a conventional servo motor or other actuator) is provided affixed to gimbal 18 and engaging a gear 36 which is attached to element 11. It is clear that upon electrical energization of rotator 35, element 11 will be rotated with respect to gimbal 18 about the azimuth axis.

To accomplish rotation of gimbal 18 about the inner roll axis an inner roll rotator 37 is provided affixed to gimbal 17 and engaging sector gear 38 attached to stub shaft 19 of gimbal 18. Similarly rotation of gimbal 17 about the pitch axis is effected by means of a pitch rotator 40 affixed to gimbal 17 which engages a gear 41 mounted on stub shaft 21 of outer gimbal 16. In the same manner rotation of outer gimbal 16 about the outer roll axis is accomplished by means of an outer roll rotator 42 which is positioned on reference frame 14 and engages a gear 43 affixed to stub shaft 23 of outer gimbal 16. It is clear that upon appropriate electrical energization of any of the rotators 35, 37, 40 and 42 rotation about the corresponding platform axis will be effected.

In addition to the above-described mechanism for rotating the platform gimbals about the platform axes, there is also provided equipment for electrically detecting and indicating gimbal rotations about each of the platform axes and for indicating the azimuth rotation of element 11 relative to inner gimbal 18. Azimuth rotation is picked off by an azimuth course synchro 45 and an azimuth fine synchro 46, these synchros 45 and 46 being mounted on gimbal 18 and engaging gears which are affixed to element 11. Azimuth rotation is also coupled in the same manner into an azimuth resolver 48 which is mounted on gimbal 18 and engages a gear (not visible) which is affixed to element 11. Resolver 48 is an important element of an electrical servo system which, it will be shown, intercouples the various mechanisms of stabilized platform 10 to effect the required servoing or corrective actions of the platform. Rotation of gimbal 18 about the inner roll axis is indicated by another synchro, designated inner roll synchro 49, which is mounted on gimbal 17 and is geared to stub shaft 20 of gimbal 18. In the same way a synchro designated as pitch synchro 50 is utilized to indicate rotation of intermediate gimbal 17 about the pitch axis and another synchro designated outer roll synchro 51 is utilized to indicate rotation of outer gimbal 16 about the outer roll axis.

Figures 2, 3A, 3B, 3C:
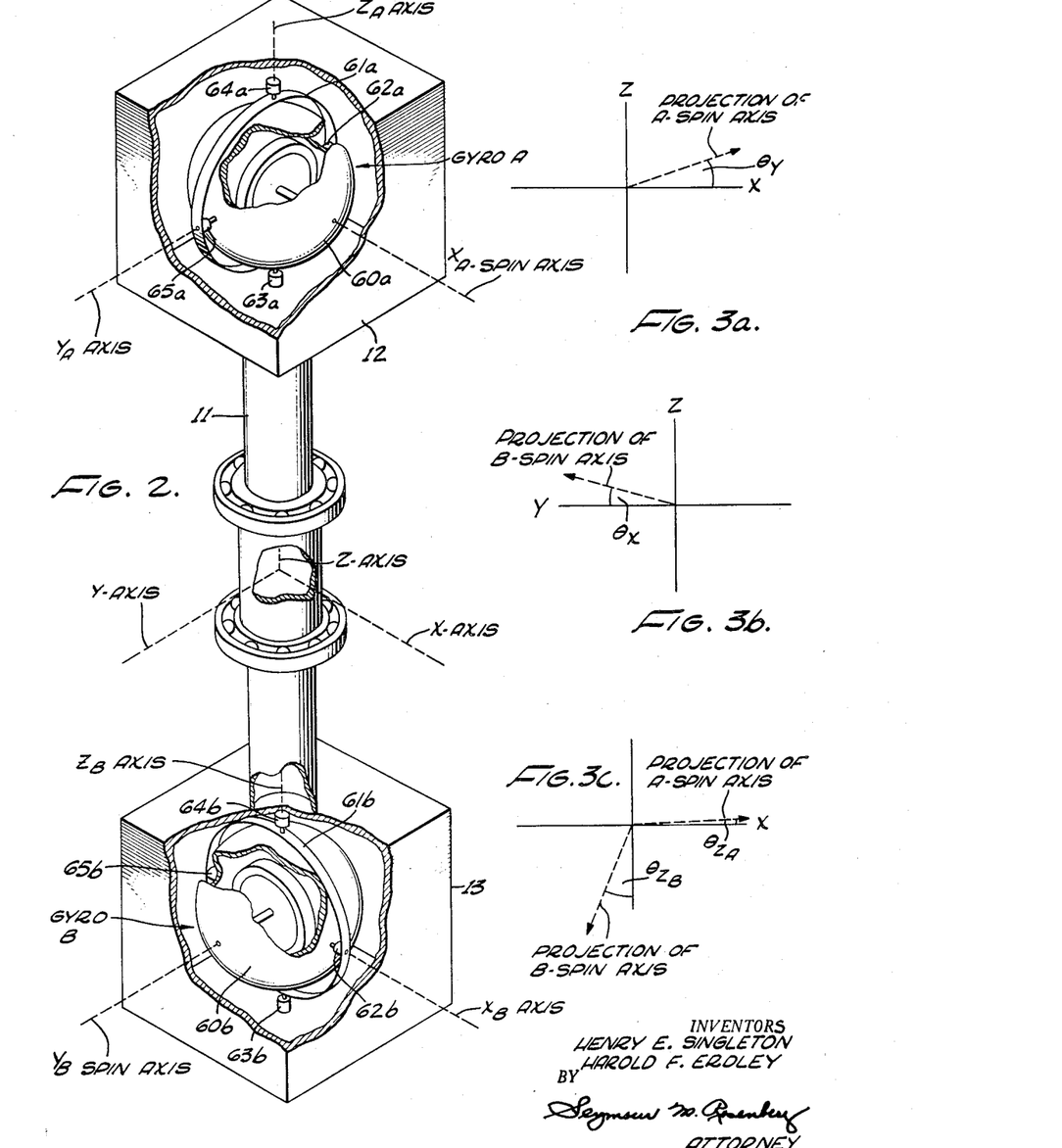
Fig. 2 is an isometric view illustrating a stabilizable element utilized in the gyro-stabilized platform shown in Fig. 1 showing this element as it appears when removed from the platform.
Figs. 3a, 3b and 3c are projective diagrams illustrating the significance of certain error angles which are sensed and utilized in the operation of the gyro-stabilized platform of the present invention.

For the purpose of illustrating the internal construction of gyros A and B and their orientation relative to element 11, reference is made to Fig. 2 wherein element 11 is shown as it would appear upon being removed from its bearing mounts in gimbal 18. The gears (such as gear 36) which are normally affixed to element 11 are not shown in Fig. 2 in order to permit greater visibility of other parts. In addition portions of box 12 (which contains gyro A) and box 13 (which contains gyro B) are shown as having been cut away, to thereby permit observation of gyros A and B. It will be understood that preferably boxes 12 and 13 will be filled with an inert low viscosity fluid such as fluoralube so as to float various portions of gyros A and B to thereby reduce bearing loading and hence reduce frictional effects in the bearings.

As illustrated in Fig. 2, gyro A comprises a conventional rotor-drive unit contained in a shell 60a which is suspended from and pivoted in bearings in a gimbal 61a so that the shell is free to rotate about an axis designated as the $Y_a$ axis of the gyro, gimbal 61a being in turn suspended from and pivoted in bearings in box 12 so that the shell is free to rotate about an axis designated as the $Z_A$ axis of the gyro. As illustrated in Fig. 2, gyro A is positioned on element 11 so that its $Z_A$ axis is coparallel with azimuth axis Z. As shown in Fig. 2 the $Z_A$ and $Y_A$ axes of the gyro are mutually perpendicular and the spin axis of the A gyro (designated as the A spin axis) is positioned so as to be substantially perpendicular to both the $Z_A$ and $Y_A$ axes.

Electrical pick-offs 62a and 63a (which may be small synchros, reluctance or inductive pick-offs, or other suitable pick-off devices) are provided for detecting and electrically indicating rotations of element 11 relative to gyro A about the $Y_A$ and $Z_A$ axes respectively. As shown in Fig. 2, pick-off 62a which will be known as the Y axis pick-off is intercoupled between gimbal 61a and shell 60a while pick-off 63a, to be known as the $Z_A$ axis pick-off, is intercoupled between gimbal 61a and case 12 (case 12, it will be remembered, being affixed to element 11). In addition suitable torque applying devices 64a and 65a (which may be small servo motors or electromagnetic torquers of the voice coil type) are provided for applying torques to the gyro about the $Z_A$ and $Y_A$ axes respectively, these devices being hereinafter referred to respectively as $Z_A$ axis torquer 64a and Y axis torquer 65a.

Thus in overall operation gyro A has two sensitive axes of rotation $Y_A$ and $Z_A$ relative to element 11 (which as shown in Fig. 2 are also the suspension axes of the gyro) and is equipped with pick-offs and torquers for respectively indicating relative rotation (between element 11 and gyro A) about these axes and for torquing the gyro about these axes. Those skilled in the art will readily perceive however that the choice of sensitive axes of rotation is not restricted to the axes of suspension of the gyro. For example, it is well known in the art that torquers and pick-offs of the type shown and of other varieties may be directly affixed to box 12 and operate upon projections of shell 60a to thereby define any desired sensitive axes of rotation of the gyro.

Gyro B as shown in Fig. 2 is substantially identical to gyro A differing only in that its spin axis, the B spin axis, is positioned substantially perpendicular to the A spin axis. Both spin axes, for reasons which will appear hereinbelow, are preferably positioned so that they are substantially horizontal. For purposes of clarity, like parts of gyros A and B are similarly numbered but are respectively associated with the subscripts a and b. As illustrated in Fig. 2 the B spin axis is substantially perpendicular to the axes of rotation of gyro B, these being designated as the $X_B$ and $Z_B$ axes of rotation. The torquers and pick-offs associated with these axes are designated respectively as X axis pick-off 62b, $Z_B$ axis pick-off 63b, $Z_B$ axis torquer 64b and X axis torquer 65b.

As explained hereinabove, the overall operation of stabilized platform 10 is to position element 11 continuously at an attitude defined by the A and B gyros. Stated in another way, the overall operation of the platform is to drive element 11 continuously so as to maintain a set of coordinate axes fixed in element 11 (these axes being the axes designated in Fig. 2 as the X, Y and Z axes) aligned respectively with a corresponding set of coordinate axes defined by gyros A and B. In general, it can be said that a coordinate axis can be defined by a gyro quite arbitrarily as any selected line or direction which is fixed in the gyro shell. To understand how a set of coordinate axes may be defined by the gyros, assume for purposes of example that the spin axis of gyro A is arbitrarily selected as defining one coordinate axis, that the spin axis of gyro B is selected as defining another coordinate axis substantially perpendicular thereto and that a third coordinate axis is implicitly defined as a line perpendicular to the A and B spin axes. The overall operation of platform 10 is then to align the X axis of element 11 continuously with the A spin axis and the Y axis of element 11 with the B spin axis, the Z axis of element 11 thereby being necessarily aligned with the perpendicular to the A and B spin axes.

With these assumptions, it becomes clear that operation of platform 10 must then be to position element 11 so as to reduce to zero any error angles existing between the A and B spin axes and the planes which are defined by the X, Y and Z axes. For purposes of convenience these angles are named and listed in the following table, Table I, together with their definitions, the locations at which they are measured, and the designations of the associated pick-offs which detect these angles and produce corresponding electrical error signals. The designations of these error signals are listed in a final column of Table I.

Table I

| Designation of Error Angle | Nature of Error Angle | Where Measured | Pick-off Utilized | Designation of Error Signal |
|---|---|---|---|---|
| $\theta_Y$ | Angle between A spin axis and X–Y plane. | about $Y_A$ axis. | Y axis pick-off 62a. | $c_Y$ |
| $\theta_X$ | Angle between B spin axis and X–Y plane. | about $X_B$ axis. | X axis pick-off 62b. | $c_X$ |
| $\theta_{Z_A}$ | Angle between A spin axis and X–Z plane. | about $Z_A$ axis. | $Z_A$ axis pick-off 63a. | $c_{Z_A}$ |
| $\theta_{Z_B}$ | Angle between B spin axis and Y–Z plane. | about $Z_B$ axis. | $Z_B$ axis pick-off 63b. | $c_{Z_B}$ |

Visualization of the nature of the above-described error angles may be assisted by reference to Figs. 3a, 3b and 3c wherein the error angles $\theta_Y$, $\theta_X$, $\theta_{Z_A}$ and $\theta_{Z_B}$ are shown, drawn in accordance with the description provided in Table I. Fig. 3a illustrates the projection of the A spin axis on the X—Z plane and shows $\theta_Y$ as the angle between this projection and the X—Y plane. Similarly Fig. 3b illustrates the projection of the B spin axis on the Y—Z plane and shown $\theta_X$ as the angle between this projection and the X—Y plane. In both Figs. 3a and 3b it is assumed that the set of X, Y, Z axes has in each instance been translated so that its center coincides with the radius center of the spin axes. In Fig. 3c there is illustrated the projections of both spin axes on the X—Y plane, it being assumed that there has been relative drift between the A and B gyros so that the angle between the A and B spin axes is greater (it could of course be less) than their predetermined separation of 90°. It is seen that $\theta_{Z_A}$ is the angle between the projection of the A spin axis and the X—Y plane while $\theta_{Z_B}$ is the angle between the projection of the B spin axis and the Y—Z plane.

As described hereinabove, the overall operation of the stabilized platform is to position element 11 (and hence the X, Y, Z axes) so as to null or reduce to zero the above-described error angles. For example, referring to Fig. 3b, if a $\theta_X$ error angle is detected, the platform immediately operates to rotate element 11 so that its Y axis is re-aligned with the B spin axis, the error angle $\theta_X$ then being reduced to zero amplitude. However, referring to Fig. 3c, the nature of the corrective action to be undertaken when a $\theta_{Z_A}$ or $\theta_{Z_B}$ error angle is detected is not so evident. The angles $\theta_{Z_A}$ and $\theta_{Z_B}$ are each independent indications of azimuth position and while it would be possible to use only one of these indications and ignore the other, a far better course of action is to use both indications of azimuth position and to average them so as to reduce statistically by the factor $$\frac{1}{\sqrt{2}}$$

the probable azimuth error due to random drift of each gyro.

Thus referring to Fig. 3c, it would be desirable to position element 11 so that it "splits the difference" and is therefore positioned at an intermediate position so that its X and Y axes are equally displaced from the initial positions of the A and B spin axes. In the stabilized platform of the present invention, a preferred averaging mechanism is utilized which not only finally positions element 11 at the required intermediate position but during the positioning process, precesses gyros A and B toward each other so that at equilibrium the A and B spin axes are restored to their 90° separation and are aligned with the X and Y axes.

In the operation of the preferred averaging mechanism, element 11 is directly controlled by gyro A through a relatively tight servo system so that the error angle $\theta_{Z_A}$ is always maintained very near a null. Thus, in azimuth, element 11 is directly slaved to the A gyro. Under these circumstances any error angle $\theta_{Z_B}$ will represent the relative drift between gyro A and gyro B. Therefore in response to a $\theta_{Z_B}$ error angle, equal torques are applied to both gyros to precess them towards each other at equal rates, the platform of course still being tightly slaved to the A gyro. When at equilibrium the $\theta_{Z_B}$ error angle is reduced to zero value, it is clear that element 11 will be at the required intermediate position and that the A and B spin axes will be aligned respectively with the X and Y axes of element 11. Actually, because the described averaging operation is continually in effect and is relatively fast acting, the overall effect of the described azimuth averaging process is that the A and B spin axes are continually maintained at their initial 90° separation and drift together at a mean drift rate which is determined by the average of the independent drift rates of the two gyros.

Figure 4:
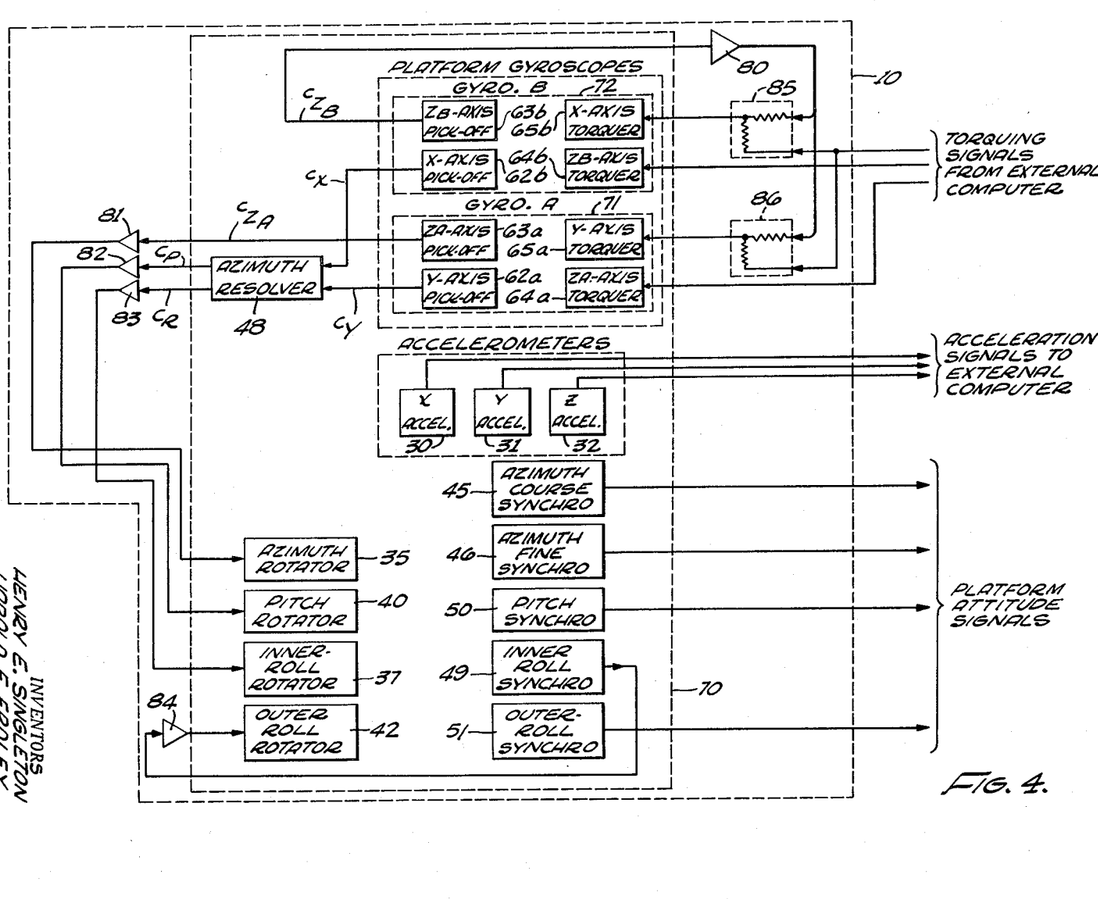
Fig. 4 is a block schematic diagram illustrating electrical interconnections between various units of the stabilized platform of the present invention and also indicating the mechanical intercouplings which exist between these units.

Further understanding of the manner in which the described azimuth averaging process is mechanized may be gained by referring now to Fig. 4 wherein is illustrated a block-schematic diagram of gyro-stabilized platform 10 showing the electrical interconnections between the various units of the stabilized platform and also indicating the mechanical intercouplings which may exist between these units because of their common mounting on the platform or because of common mounting on the A or B gyros. As illustrated in the overall schematic diagram of platform 10 which is provided in Fig. 4, all units of the platform which are normally physically mounted on the platform are grouped together and enclosed by a dotted line 70. The mechanical intercoupling of the units shown within dotted line 70 has already been fully described in connection with Figs. 1 and 2 supra. For purposes of additional clarification those units which are mounted on gyro A and are physically intercoupled thereto, are grouped together within a dotted line 71 and in the same manner the units which are mounted on gyro B are enclosed by a dotted line 72. As illustrated in Fig. 4, five servo amplifiers, designated in Fig. 4 as amplifiers 80, 81, 82, 83 and 84 are utilized in the mechanization of platform 10, these amplifiers normally being mounted elsewhere on the vehicle rather than on the platform itself.

It will be understood that electrical interconnections between these amplifiers and associated components on the platform are established through conventional slip ring assemblies on the platform axes. If desired flexible wires may be alternatively used to establish electrical connection between intermediate gimbal 17 and inner gimbal 18, since it is known that the relative rotation between these gimbals will be limited to small amplitudes. It should also be understood that flexible leads may be utilized in conventional manner to establish electrical connection to the motor drive, torquers and pick-offs of gyros A and B. For purposes of clarity and to eliminate unnecessary drawing complexity the various slip ring assemblies and lead wires have been deleted from Figs. 1 and 2, it being felt that the manner in which such connection is made is very well known to the art.

Referring again to Fig. 4 and considering once more the mechanism provided for slaving the platform in azimuth to gyro A and for averaging the independent measures of azimuth deviation provided by gyros A and B, it will be recalled that any azimuth deviation of the A gyro ($\theta_{Z_A}$) is detected by $Z_A$ axis-pick-off 63a and converted to the error signal $c_{Z_A}$. As shown in Fig. 4 the error signal $c_{Z_A}$ produced by pick-off 63a is applied to servo amplifier 81, the amplified error signal produced by the amplifier being applied to azimuth rotator 35 which in response thereto drives element 11 relative to gimbal 18 until the error signal (and thus angle $\theta_{Z_A}$) is reduced to zero. In this manner element 11 is continuously slaved in azimuth to the A gyro.

Since element 11 is then aligned in azimuth with gyro A, as explained before the total relative drift between gyro A and gyro B will appear as the gyro B azimuth angle $\theta_{Z_B}$ which it will be remembered is detected by $Z_B$ axis pick-off 63b and converted to the corresponding electrical error signal $c_{Z_B}$. As shown in Fig. 4 the error signal $c_{Z_B}$ produced by pick-off 63b is applied to amplifier 80 which in response thereto produces two amplified error signals which are equal but opposite in polarity, these error signals being applied through summing networks 85 and 86 respectively (which may be simple resistive adding circuits as shown in Fig. 4) directly to X axis torquer 65b and to Y axis torquer 65a. In response to the application of these signals thereto, torquers 65b and 65a apply equal but opposite torques about the $X_B$ and $Y_A$ axes, this having the desired effect of precessing gyros A and B towards each other at equal rotational rates about azimuth axis Z so that the A and B spin axes are returned to their original perpendicular relationship and move together in azimuth at a mean rate determined by the average of the independent azimuth rates of the two gyros. Because of this azimuth averaging operation, the stabilization of element 11 in azimuth is determined by both gyros, although as explained hereinbefore element 11 is directly slaved in azimuth only to gyro A.

The resultant angular position of element 11 about the azimuth axis is measured and electrically indicated by the azimuth course and fine synchros 45 and 46, the output signals produced by these synchros being externally supplied, as shown in Fig. 4, as an indication of platform attitude in azimuth which may be utilized by the vehicle pilot or by automatic control devices. The azimuth displacement of element 11 is also mechanically coupled, in the manner previously described, into azimuth resolver 48. Thus if element 11 has been rotated in azimuth so that its X axis is displaced by an angle $\phi_Z$ from the inner roll axis of gimbal 18, it will be understood that the rotor of resolver 48 will be displaced by a corresponding angle from its null position relative to the stator of resolver 48. This allows resolver 48 to be utilized for coordinate transformation operations between the X axis-Y axis coordinate system of element 11 and the inner-roll axis-pitch axis coordinate system of intermediate gimbal 18.

It will be remembered that any rotations of element 11 about the $X_B$ or $Y_A$ axes are detected respectively by X axis pick-off 62b and Y axis pick-off 62a as the angles $\theta_X$ and $\theta_Y$ and are converted to corresponding error signals $c_X$ and $c_Y$. These error signals derived from the X—Y coordinate system of element 11 are then transformed into appropriate error signals (designated $c_P$ and $c_R$) for the inner-roll and pitch coordinate system of gimbal 18, by being applied as shown in Fig. 4 to resolver 48 which in response thereto produced the transferred output signals $c_P$ and $c_R$. Those skilled in the art will understand that the transformed signals $c_P$ and $c_R$ are related to the input signals $c_X$ and $c_Y$ and the azimuth angle $\theta_Z$ in the manner defined by the following conventional coordinate transformation equations, Equations (1) and (2):

$$c_P = -c_X \sin \phi_Z + c_Y \cos \phi_Z \qquad (1)$$

$$c_R = c_X \cos \phi_Z + c_Y \sin \phi_Z \qquad (2)$$

As illustrated in Fig. 4 the transformed error signals $c_P$ and $c_R$ produced by resolver 48 are applied respectively to amplifiers 82 and 83 respectively, the amplified error signals then being applied to pitch rotator 40 and inner roll rotator 37 respectively. In response to such error signals, pitch rotator 40 rotates gimbal 17 about its pitch axis and inner roll rotator 37 rotates gimbal 18 about the inner roll axis until, through the coordinated action of both rotators, the error signals $c_X$ and $c_Y$ are reduced to zero values, thereby indicating that element 11 has been re-aligned with gyros A and B.

In order to limit the amplitude of inner roll rotation and to produce slewing motions that prevent gimbal lock, inner roll rotation is detected and converted to an electrical error signal by inner roll synchro 49, the output error signal produced by synchro 49 being applied through amplifier 84 to outer roll rotator 42. In response to application of this error signal, rotator 42 acts to rotate outer gimbal 16 about the outer roll axis until inner roll rotation is reduced to a zero value. In this manner inner roll rotation is continually maintained at or very near null values and platform attitude is represented by outer roll rotation.

As indicated in Fig. 4 and as hereinbefore explained, pitch rotation and outer roll rotation are measured and electrically indicated by pitch synchro 50 and outer roll synchro 51 respectively, the output signals produced by these synchros being supplied externally as indications of platform attitude. In addition, as shown in Fig. 4, the acceleration signals produced by accelerometers 30, 31 and 32 (if such accelerometers are utilized) are also externally supplied. Normally such acceleration signals will be received by an external computer and continually integrated to determine vehicle velocity and position with reference to the X, Y, Z axes determined by the gyros and hence by stabilized element 11 on which the accelerometers are mounted.

It has been hitherto explained that in one mode of operation of a gyro-stabilized platform the attitude which is defined by the gyros and which is stably maintained by element 11 remains fixed and unvarying in inertial space throughout the vehicle's journey, while in another mode of operation of a gyro-stabilized platform, the so-called local vertical mode of operation, very small precessional torques are fed into the gyros to continuously erect the gyros to the earth vertical at the point of vehicle location. Those skilled in the art know that in the local vertical mode of operation an external computer calculates from the accelerometer data the velocity of the vehicle about the earth (vehicle rate), sums this quantity with the known velocity of rotation of the earth (earth rate), and from this sum computes the rates at which the gyros must be precessed so that the X—Y plane defined by the gyros will continually be tilted so as to remain perpendicular to the earth vertical at the point of vehicle location. In addition the external computer ordinarily converts these calculated precession rates into appropriate torquing signals which will produce the desired precession rates when applied to the gyro torquers.

Since the local reference mode of operation is preferred for many applications of a gyro-stabilized platform, provisions have been made (as shown in Fig. 4) in platform 10 of the present invention for accepting such torquing signals which may be applied thereto by an external computer. Referring to Fig. 4, it is seen that two such torquing signals may be directly applied to $Z_B$ axis torquer 64b and $Z_A$ axis torquer 64a respectively to thereby cause gyro precession about the X and Y axes while a third torquing signal may be applied through summing networks 85 and 86 respectively to both X axis torquer 65b and Y axis torquer 65a to thereby cause common precession of the A and B gyros about their shared Z axis. In this manner the external computer is able to continuously erect the gyros so that their common Z axis is aligned with the earth vertical (and hence with the direction of gravitational attraction).

The fact that in the local reference mode of operation the direction of gravity is known and is aligned with the Z axis of element 11 allows one particularly troublesome although often unsuspected source of error and gyro drift to be removed.

Note in Fig. 2 that the outer gimbal suspension axes ($Z_A$ and $Z_B$ axes) of both gyros are vertical (aligned with the common Z axis) while the inner gimbal suspension axes (the $Y_A$ and $X_B$ axes) are horizontal. This configuration was not decided upon haphazardly but was arrived at through careful and close analysis of the possible deleterious effects of sideplay and endplay in the bearings which defines the outer and inner suspension axes of the gyro. Since the gravity produced torques are quite often those of greatest importance and since accuracy is ordinarily desired in the definition of azimuth, the end to be sought is the elimination of those effects of bearing play which might cause precession about the azimuth or Z axis.

Referring to gyro A in Fig. 2, consider the possible effects of sideplay and endplay in the bearings which define the outer (here vertical) gimbal suspension axis. Such bearing play may allow a pure translation of the entire gyro assembly relative to box 12 but this will of course not produce any precessional torques. Similarly play in the bearings which define the inner gimbal suspension axis may allow pure horizontal translation of shell 60a relative to gimbal 61a, but again it is clear that this will not cause any precessional torques. Thus it is clear that with the direction of gravitational attraction aligned with the outer suspension axis in the described manner, play in either set of bearings cannot cause precessional torques.

Now for purpose of contrast, imagine that box 12 has been turned about so that its inner suspension axis is vertical, that is so that the direction of gravitational attraction is aligned with the $Y_A$ axis of the gyro. Now, play in the bearings defining the outer (horizontal) gimbal suspension axis allows only pure translation as before. However play in the bearings defining the inner (vertical) gimbal suspension axis allows shell 60a to shift laterally relative to the horizontal suspension axis thereby causing an unbalanced torque about the horizontal suspension axis which creates azimuthal drift rates. Even very minute bearing sideplay can under these circumstances cause serious azimuth drift rates.

It is therefore clear that remarkable reductions in azimuthal drift can be obtained by mounting the gyros so that their outer gimbal suspension axes are aligned with the direction of gravitation. This is a discovery of considerable importance that is expected to have great effect in improving the performance of gyro stabilized platforms when they are operated so as to maintain a known vertical attitude.

What is claimed as new is:

1. In a gyro-stabilized platform for use in an inertial guidance system, the combination comprising: a reference frame; a stabilizable element rotatably connected to said reference frame, said element having first, second and third axes of rotation with respect to said reference frame; purely inertial means for operating free of any external reference to stabilize said element, said purely inertial means including first and second 2-degree-of-freedom gyroscopes rotatably coupled to said element, said first gyroscope having fourth and fifth axes of rotation with respect to said element and said second gyroscope having a sixth axis of rotation with respect to said element, said purely inertial means further including pick-off means intercoupling said gyroscopes and said element for producing a plurality of control signals comprising 1st, 2nd and 3rd control signals respectively representing the rotation of said element relative to said gyroscopes about fourth, fifth and sixth axes, first actuating means responsive to said 1st and 3rd control signals for rotating said element with respect to said frame about said first axis, second actuating means responsive to said 1st and 3rd control signals for rotating said element about said second axis, third actuating means responsive to said 2nd control signal for rotating said element about said third axis; and acceleration sensing means mounted on said stabilizable element for generating electrical output signals representative of accelerations applied to said stabilizable element along said fourth, fifth and sixth axes.

2. The combination defined by claim 1 wherein said fourth and fifth axes of rotation of said first gyroscope are substantially mutually perpendicular and said second gyroscope is mounted on said element so that said sixth axis of rotation is substantially perpendicular to said fourth and fifth axes.

3. In a gyro-stabilized platform, the combination comprising: a reference frame; a stabilizable element rotatably connected to said reference frame, said element having first, second and third axes of rotation with respect to said reference frame; first and second 2-degree-of-freedom gyroscopes rotatably coupled to said element, said first gyroscope having fourth and fifth axes of rotation with respect to said element and said second gyroscope having sixth and seventh axes of rotation with respect to said element; pick-off means intercoupling said gyroscopes and said element for producing a plurality of control signals comprising 1st, 2nd, 3rd and 4th control signals respectively representing the rotations of said element relative to said gyroscopes about said fourth, fifth, sixth and seventh axes; first actuating means responsive to said 1st and 3rd control signals for rotating said element with respect to said frame about said first axis; second actuating means responsive to said 1st and 3rd control signals for rotating said element with respect to said frame about said second axis; and third actuating means responsive to said 2nd and 4th control signals for rotating said element about said third axis.

4. The combination defined by claim 3 wherein said first and second actuating means includes a common resolver intercoupling said element and said reference frame for sensing rotational displacement of said element about said third axis and combining said 1st and 3rd control signals in accordance with the rotational displacement to produce first and second output signals, said first actuating means including a first servo motor responsive to said first output signal for rotating said element about said first axis and said second actuating means including a second servo motor responsive to said second output signal for rotating said element about said second axis.

5. In a gyro-stabilized platform, the combination comprising: a reference frame; a stabilizable element rotatably connected to said reference frame, said element having $x_e$, $y_e$ and $z_e$ axes of rotation with respect to said reference frame; first and second 2-degree-of-freedom gyroscopes rotatably coupled to said element, said first gyroscope having two substantially mutually perpendicular axes of rotation, $x_1$ and $z_1$, with respect to said element and said second gyroscope having two substantially mutually perpendicular axes of rotation $y_2$ and $z_2$ with respect to said element; pick-off means intercoupling said first and second gyroscopes and said element for producing a plurality of control signals $c_{x_1}$, $c_{y_2}$, $c_{z_1}$ and $c_{z_2}$, respectively, respresenting the rotation of said element relative to said gyroscopes about said $x_1$, $y_2$, $z_1$ and $z_2$ axes; first actuating means responsive to said $c_{x_1}$ and $c_{y_2}$ control signals for rotating said element with respect to said frame about said $x_e$ axis; second actuating means responsive to said $c_{x_1}$ and $c_{y_2}$ control signals for rotating said element about said $y_e$ axis; and third actuating means responsive to said $c_{z_1}$ and $c_{z_2}$ signals for rotating said element about said $z_e$ axis.

6. The combination defined by claim 5 wherein said first and second gyroscopes are positioned with respect to said element so that said $z_1$ and $z_2$ axes are both substantially parallel to said $z_e$ axis of said element, said first and second gyroscopes having first and second spin axes respectively, each of said spin axes being positioned substantially perpendicular to $z_e$ axis, said third actuating means including apparatus responsive to said $c_{z_1}$ and $c_{z_2}$ signals for rotating said element about said $z_e$ axis to maintain substantially zero rotational displacement about $z_e$ axis between said element and said gyroscopes.

7. The combination defined by claim 5 wherein said $x_e$, $y_e$ and $z_e$ axes of said element are mutually perpendicular and said $x_1$ and $y_2$ axes are each substantially perpendicular to said $z_e$ axis.

8. In a gyro-stabilized platform, the combination comprising: a stabilized element having a first 2-degree-of-freedom gyro and a second 2-degree-of-freedom gyro mounted thereon, each gyro having two axes of rotation relative to said element, said first gyro having a first axis of rotation, and said second gyro having a second axis of rotation substantially parallel to said first axis of rotation; first means intercoupling said gyros and said element for producing a resultant signal representative of the rotational displacement of said first gyro from said second gyro about said first and second axes; and second means responsive to said resultant signal for torquing said second gyro to precess said second gyro about said second axis towards said first gyro to thereby reduce the rotational displacement of said second gyro from said first gyro.

9. The combination defined by claim 8 wherein said second means includes apparatus responsive to said resultant signal for simultaneously torquing said first gyro to precess said first gyro about said first axis towards said second gyro whereby said first and second gyros are both precessed towards intermediate rotational positions.

10. The combination defined by claim 9 wherein said gyros are positioned on said element so that said first and second axes of rotation are substantially colinear.

11. The combination defined by claim 8 wherein said first means includes pick-off means intercoupling said gyros and said element for producing first and second controls signals respectively representative of the rotation of said first gyro about said first axis and the rotation of said second gyro about said second axis, and also includes means responsive to said first and second control signals for producing said resultant signal.

12. The combination defined by claim 8 wherein said first means includes a first pick-off intercoupling said first gyro and said element for producing a first pick-off signal representative of the rotational displacement about said first axis of said element from said first gyro and a first servo actuator responsive to said first pick-off signal for rotating said element about said first axis to maintain said element undisplaced from said first gyro and also includes a second pick-off intercoupling said second gyro and said element for producing said resultant signal, said resultant signal being representative of the rotational displacement about said second axis of said second gyro from said element and thereby being representative of the rotational displacement of said second gyro from said first gyro.

13. In a gyro-stabilized platform for an inertial autonavigator, the combination comprising: a reference frame; a stabilizable element rotatably connected to said reference frame, said element having at least three axes of rotation relative to said reference frame; purely inertial means for operating free of any external reference to stabilize said element, said purely inertial means including first and second 2-degree-of-freedom gyroscopes rotatably connected to said element, each gyroscope having an internal rotor spin axis, pick-off means intercoupling said gyroscopes and said element for producing control signals representing the angular rotations of said element with reference to said gyroscopes, and further including means responsive to said control signals for rotating said element with respect to said reference frame about said axes of rotation to diminish said angular rotations of said element with reference to said gyroscopes; and acceleration sensing means positioned on said stabilizable element for sensing accelerations applied to said stabilizable element along each of three predetermined and mutually orthogonal axes and for generating electrical output signals representative of said accelerations.

14. The combination defined by claim 1 wherein said element has four axes of rotation relative to said reference frame, two of said axes being substantially parallel.

References Cited in the file of this patent

UNITED STATES PATENTS

| | | |
|---|---|---|
| 2,608,867 | Kellogg et al. | Sept. 2, 1952 |
| 2,729,107 | Braddon | Jan. 3, 1956 |
| 2,729,108 | Vacquier | Jan. 3, 1956 |
| 2,752,792 | Draper et al. | July 3, 1956 |